United States Patent
Edström

[11] Patent Number: 5,951,761
[45] Date of Patent: Sep. 14, 1999

[54] DEVICE FOR APPLYING AN INTERNAL COATING IN TUBES

[76] Inventor: Sten Edström, N. Grönskärsvägen 5, S-804 29, Gävle, Sweden

[21] Appl. No.: 08/945,164
[22] PCT Filed: Jun. 28, 1996
[86] PCT No.: PCT/SE95/00857
   § 371 Date: Dec. 24, 1997
   § 102(e) Date: Dec. 24, 1997
[87] PCT Pub. No.: WO97/01724
   PCT Pub. Date: Jan. 16, 1997

[30] Foreign Application Priority Data

Jun. 28, 1995 [SE] Sweden .................................. 9502330

[51] Int. Cl.⁶ ........................................................ B05B 13/06
[52] U.S. Cl. .................. 118/306; 118/317; 118/DIG. 10
[58] Field of Search ..................................... 118/306, 317, 118/DIG. 10, 318; 134/167 C, 168 C, 169 C, 166 C

[56] References Cited

U.S. PATENT DOCUMENTS

| | | | |
|---|---|---|---|
| 2,287,448 | 6/1942 | Perkins ..................................... | 118/306 |
| 2,617,123 | 10/1952 | Barton, Jr. ............................... | 118/306 |
| 2,617,134 | 10/1952 | Barton, Jr. ............................... | 118/DIG. 10 |
| 3,106,735 | 10/1963 | Landrum et al. ........................ | 118/306 |
| 3,159,895 | 12/1964 | Perovich .................................. | 118/306 |
| 3,818,862 | 6/1974 | O'Brien et al. .......................... | 118/306 |
| 4,414,918 | 11/1983 | Holland et al. .......................... | 118/306 |
| 4,735,168 | 4/1988 | Attwell .................................... | 118/305 |

FOREIGN PATENT DOCUMENTS

| | | |
|---|---|---|
| 383053 | 10/1986 | Austria . |
| 142046 | 8/1980 | Denmark . |
| 470488 | 4/1994 | Sweden . |

Primary Examiner—David A. Simmons
Assistant Examiner—Calvin Padgett
Attorney, Agent, or Firm—Dilworth & Barrese

[57] ABSTRACT

A device for applying an internal coating in tubes (22) comprises a device (6,15) for feeding a coating material (14) to a nozzle (7) and an arrangement adapted to influence the material out of the nozzle (7) towards the inner wall of a tube (22) when the nozzle (7) is moved through the tube (22). This arrangement is adapted to make the nozzle (7) rotate while throwing the coating material fed thereto substantially radially outwardly through apertures (20) arranged substantially radially in the nozzle (7) towards the inner wall (24) of the tube (22). The arrangement comprises, for this purpose, a driving device (10) intended to be arranged outside the tube (22) to be coated and to drive an elongated flexible member (17) to rotate, the end of this member (17) being rigidly connected to the nozzle (7) for rotating thereof.

20 Claims, 3 Drawing Sheets

DEVICE FOR APPLYING AN INTERNAL COATING IN TUBES

FIELD OF THE INVENTION AND PRIOR ART

The present invention relates to a device for applying an internal coating in tubes according to the preamble of the appended independent claims.

Such devices may be used for internally coating all types of tubes or pipes, wherein such devices for internally coating water pipes will hereafter be discussed for illuminating the invention but not in any way for limitation thereof. "Water pipes" is defined as comprising all types of tubes or pipes that conduct water, also waste water and discharge pipes, larger main pipes in the soil as well as pipes in the heating, water and sanitation system of accommodations. The condition of pipes of this type is impaired with age, and for instance rust in tubes of cast iron tends to create holes in the walls thereof at some exposed locations, which may lead to leakage having sometimes severe consequences, such as costly moisture damages in buildings, leakage of substances being harmful to the environment into the soil and so on. Also tubes of plastic are changed over a period of time and fissures therein may arise as a consequence of ageing. There is therefore a need to recondition such pipes after a certain period of time through an internal coating thereof by a protecting layer, so that holes or fissures in the pipes resulting in damages of the environment will never appear. A series of devices of this type are therefor known, which have any form of slide or carriage that is usually pulled through a tube to be reconditioned while spraying coating material onto the inner wall of the tube through a nozzle arranged at the slide or the carriage.

Such a device is known through for example EP-A1-0 094 819. However, this and other devices of this type already known have a severe disadvantage in not enabling internal coating of tubes having a limited cross-section, such as different water pipes in buildings, but they are intended for coating larger tubes or pipes, such as discharge main pipes leading to purifying plants and the like. The reason for this is that the arrangement which is adapted to make the nozzle rotate for throwing the coating material towards the inner wall of the tubes in question has so important dimensions, that it is impossible to bring such an arrangement with a nozzle arranged thereon through tubes having small diameters, especially waste pipe tubes and tubes having smaller dimensions in the heating, water and sanitation system of buildings. However, it is pointed out that the invention is not in any way restricted to coating of tubes having small cross-section dimensions. The arrangement used may drive the nozzle to rotation through utilizing compressed air or an electric motor.

In some cases the very design of the nozzle, which may not be too small for allowing an acceptably rapid operation of the device, set a limit for how thin tubes may be for being coated, by the tendency of such a nozzle to hit the inner wall of the tube in question with an outer edge thereof when moving through bends of the pipe, which implies a risk of leaving any point of the inner wall uncoated, so that it may not be completely relied upon a reconditioning of the tube in question being good enough.

SUMMARY OF THE INVENTION

The object of the present invention is to provide a device solving the problem mentioned above of already known devices of the type mentioned above.

This object is according to the invention obtained by providing such a device with an arrangement comprising driving means adapted to be arranged outside the tube to be coated and to drive an elongated flexible member to rotate, the end of said member being rigidly connected to the nozzle for rotation thereof. Thus, by utilizing an elongated flexible member for rotating the nozzle the means driving the nozzle to rotate, such as a suitable electrical motor or the like, may be arranged outside the tube in question and will therefor not act limiting upon how thin the tubes which may be coated by the device may be. A device of this type may therefore without any problems be constructed for reconditioning of tubes having inside diameters as small as in the order of 50 mm. By using an elongated flexible member as a connection link between the driving means and the nozzle, the driving means may without any problem "reach" the nozzle also when this has been moved through bends or curves or in another way changed its direction. In such an arrangement of the driving means outside the tube that part of the device which is moved inside the tube may be made considerably lighter than before, a thing which among other things will reduce the risk for damaging the tube in any way when moving therethrough and it will facilitate a desired centering of the nozzle in the tube in question, since the gravitation will have less influence upon such a centering.

According to a preferred embodiment of the invention, said elongated flexible member is a metal wire, preferably a steel wire, which has turned out to function very well as elongated flexible member also when large lengths thereof are utilized.

Another preferred embodiment of the invention is defined in the other independent claim, and by the fact that the nozzle has an inner space for receiving coating materials fed thereto through said means, which is delimited by a wall tapering the outer cross-section of the nozzle towards a free end of the nozzle remote from the feeding means, it will be possible to move a nozzle having comparatively large transversal dimensions through thin tubes, i.e. tubes having small inside diameters, without any risk that the nozzle will with the front edge thereof hit the inner wall of the tube when moving through bends and sharp curves.

According to a preferred embodiment of the invention of this device an inner wall of the nozzle restricting said space diverges in the direction from said end, and the apertures arranged substantially radially are arranged in the wall at a second end of the nozzle located opposite to the free end and where said space is broadest. It will in this way be possible to provide a nozzle space having a comparatively large volume in spite of avoiding the disadvantage of hitting against inner walls in tubes when passing through bends by the front limitation of the nozzle at the same time as the centrifugal force will ensure that all the coating material will reach the apertures, although they are only located in the axial direction at one end of said space.

According to another preferred embodiment of such a device according to the invention radial cuts are carried out in the wall of the nozzle substantially radially to the axis of rotation of the nozzle for forming said radial apertures, and each of said cuts is adapted to cause spreading of the coating material thrown out through the respective aperture in axial direction. By carrying out such cuts, it will be possible to obtain a good axial spreading of the coating material thrown out through the respective aperture even when comparatively small apertures or apertures having a comparatively small extension in axial direction with respect to the axial extension of the nozzle are arranged. Concentrated point-like beams of material are thereby avoided, which could lead to a non-uniform result of the coating operation or at worst to any form of damage of weak tube parts.

According to a further preferred embodiment of the invention the feeding means is intended to feed a coating material comprising a mixture of polyester and a hardening agent. It has turned out that a device according to the invention is well suited to throw out such a comparatively viscous mixture, which gives rise to a very even, fine and flexible coating layer.

According to still a further preferred embodiment of the invention said mixture also comprises glass flakes for obtaining coating of a glass flake reinforced polyester. By mixing glass flakes into said mixture it will be possible to spray a considerably thicker layer onto the inner wall of a tube, since the glass flakes make the mixture more viscous and keep it better together, wherein the thickness increase itself makes such a coating stronger than a thinner coating, but the glass flakes reinforce the coating in a remarkable way, so that a very strong coating is obtained, which may almost be compared with putting a resistant inner tube into the tube already existing perfectly fitting therein.

According to another embodiment of the invention, the device comprises means for centering the nozzle in a tube, the inner wall of which is to be coated, with the axis of rotation thereof substantially coinciding with the center axis of the tube, and these centering means comprise a disc of flexible material arranged in the movement direction of the nozzle in front thereof and which has substantially the same diameter as the inside diameter of the tube, said disc being arranged to bear against the inner wall of the tube for centering the nozzle. Such a centering means will function excellently, and it is especially well applicable to a device having driving means of said arrangement located outside the tube, i.e. a device in which the nozzle and the part onto which it is arranged is very light and the gravitation thereby will have a minor influence upon said centering disc and this may therefore be used just as well in tube portions extending horizontally as extending more or less vertically.

According to another preferred embodiment of the invention such a centering means comprises a wisp-like member arranged in the movement direction of the nozzle in front of the nozzle and which in an unloaded state has straws extending radially outwardly and transversely with respect to the axis of rotation of the nozzle, said straws being adapted to be partially bent by the inner wall of the tube when the wisp-like member is introduced into a tube for centering said nozzle. Also such a centering means is particularly well suited for a light device part with nozzle and carrier thereof and thereby a device part being slightly dependent upon the gravitation and allows a very smooth following of the inner wall of the tube while maintaining a good centering, in which such a centering means is particularly advantageous when larger internal joints in tubes are passed, since a generation of an abrupt and jump-like movement of the nozzle with carrier is then avoided. The two different centering means mentioned may very well be combined and arranged at a certain mutual distance in the movement direction of the nozzle for stabilizing the nozzle primarily when moving it through long tubes.

Further advantages as well as preferred features of the invention will appear from the following description and the other dependent claims.

BRIEF DESCRIPTION OF THE DRAWINGS

With reference to the appended drawings, below follows a description of preferred embodiments of the invention cited as examples.

In the drawings.

DETAILED DESCRIPTION OF PREFERRED EMBODIMENTS OF THE INVENTION

Figure 1:
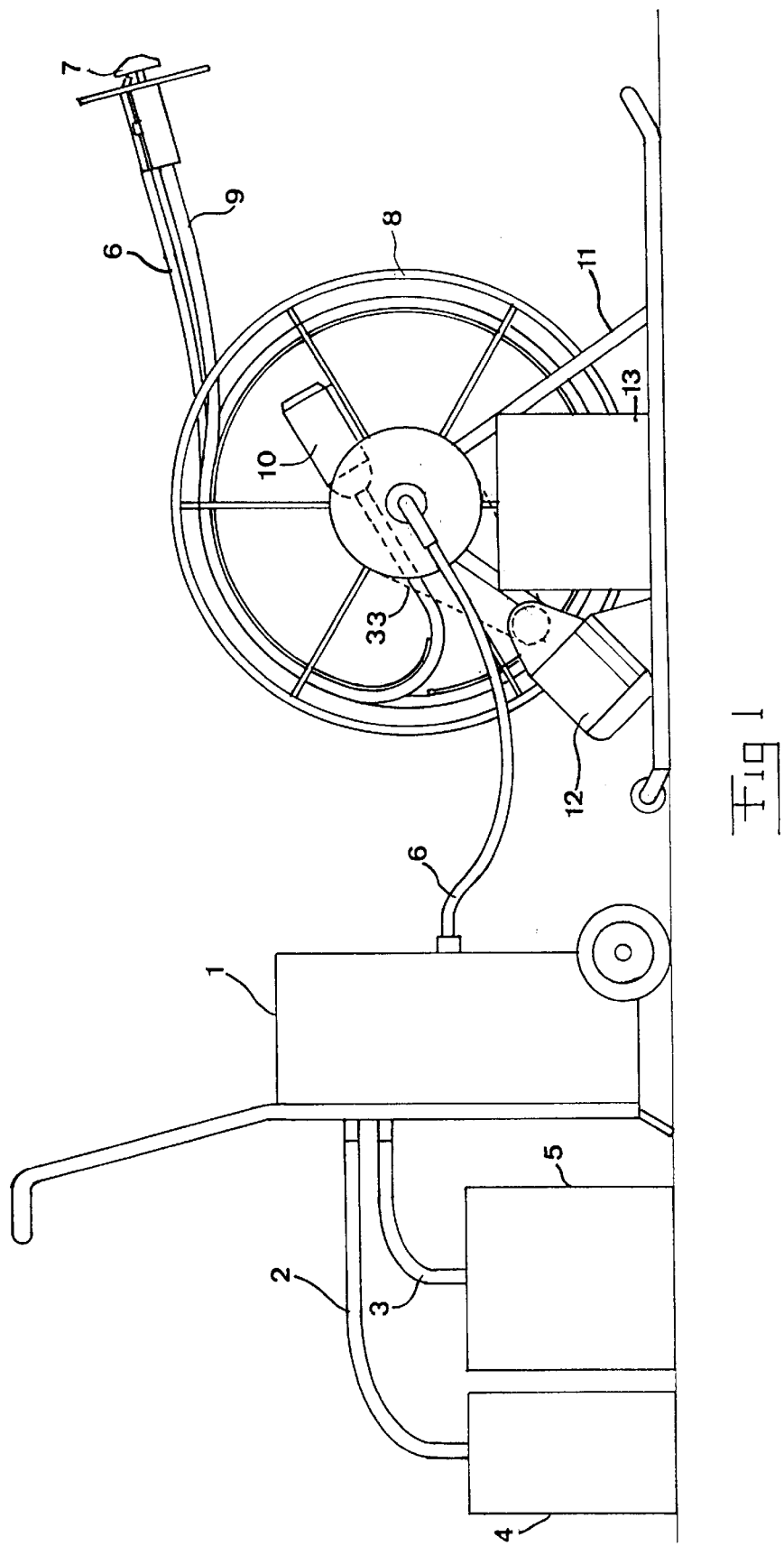
FIG. 1 is a very simplified view illustrating the overall construction of a device according to the invention.

A device according to the invention for internally coating tubes, especially water pipes for reconditioning thereof, is illustrated very schematically in FIG. 1. The device comprises an arrangement 1 schematically indicated for preparing the coating material, which through conduits 2 and 3 fetches a hardening or curing agent and the very coating mass, respectively, from containers therefor 4 and 5, respectively. The mass of the container 5 is preferably of polyester, in which glass flakes have been mixed in. The preparing arrangement 1 has means in the form of a hose for feeding the prepared coating material to a nozzle 7, from which it is intended to be sprayed out onto the inner wall in a tube. The hose 6 is for this sake led to a supply drum 8 and is wound therearound together with the cable-like member 9, which is formed by an elongated flexible member in the form of a steel wire and a jacket arranged outside thereof adapted to enabling rotation of said elongated member about the longitudinal axis thereof. The cable-like member 9 comes from a driving means 10 in the form of an electrical high revolution motor for wire rotation, which is arranged on the same stand 11 as the supply drum 8 and for driving said elongated member to rotate inside the cable-like member 9. The cable-like member 9 and the hose 6 are wound about the supply drum and to the region of the nozzle 7 running close to each other and together at suitable locations. Furthermore, the device comprises a second driving means 12 arranged on the stand 11 in the form of an electrical motor, which is arranged to drive the supply drum 8 to rotate through a chain transmission 33 schematically indicated for pulling the nozzle 7 and the carrier therefor through a tube to be coated in a way to be explained further below. An arrangement 13 adapted to supply energy to the driving means 10 and 12 and control them is also arranged on the stand 11, said arrangement being preferably intended to be connected to the electrical network.

The device shown in FIG. 1 is mobile and may easily be transported to the location at which the pipe is to be internally coated for reconditioning thereof. The conduits 2 and 3 and the hose 6 are then preferably loosened at suitable locations.

When a device according to FIG. 1 is utilized for internally coating tubes this will take place in the following way. A comparatively stiff wire will be introduced into one end of the tube and this is brought out through another end or opening of the tube and is secured to the nozzle 7 of the device or the carrier onto which the nozzle is arranged, alternatively to the hose 6 or the cable-like member 9. The nozzle is then pulled through the tube to the end first mentioned, whereupon the arrangement 13 is actuated to control the second driving means 12 to slowly, with a speed in the order of 1 m per min, rotate the supply drum 8 for winding up the hose 6 and the cable-like member 9 thereon. The means for feeding coating material to the nozzle is at the same time controlled to feed material to the nozzle, and the driving means 10 will through making said steel wire rotate take care of a rotation of the nozzle 7 for throwing coating material fed thereto onto the inner wall of the tube during the movement of the nozzle through the tube. Thus, the nozzle will then be the part that comes at the end in the direction of movement, which is a necessity, since otherwise parts of the device could destroy the coating layer applied before hardening thereof, but a movement in the opposite direction would primarily mean that the coating material would stick everywhere on the equipment in a completely unacceptable way.

Figure 2:
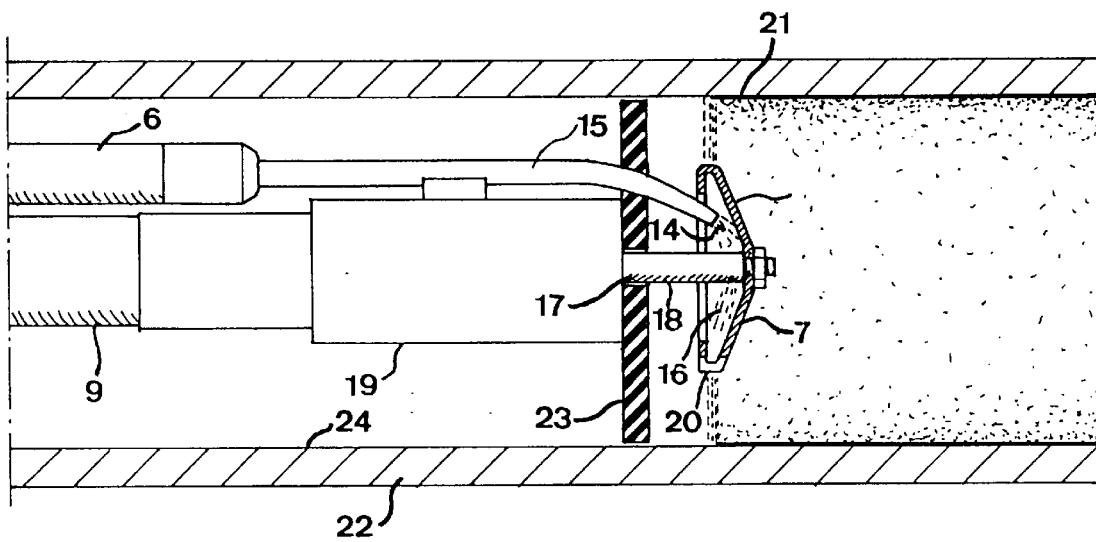
FIG. 2 is a partially sectioned view illustrating how the device shown in FIG. 1 applies an internal coating in a tube.

The more particular construction of the device according to the invention will now be explained with reference to the other drawing figures. It is illustrated in FIG. 2 how the coating material 14 is delivered by a spout-like means 15 terminating the hose 6 into an inner space 16 of the nozzle 7. The elongated flexible member 17 extending in the cable-like member 9 is terminated by a stiff part 18, which creates a connection being rigid with respect to rotation between the member 17 and the nozzle 7. The elongated member 17 and the stiff part 18 are rotatably journalled in a house or frame part 19 to which also the spout-like means 15 is fixed. The driving means 10 is adapted to make the elongated member 17 and thereby the nozzle 7 rotate about a rotation axis being intended to be directed substantially in parallel with and preferably coinciding with the center axis of the tube to be coated, and which coincides with a symmetry axis of the nozzle 7, with a high speed, which exceeds 4000 revolutions/minute and preferably is between 6000 and 8000 revolutions/minute.

Substantially radially directed apertures 20 are arranged in the nozzle 7, and the centrifugal force generated by the rotation of the nozzle will throw the coating material introduced into the space 16 radially outwardly through these apertures. By the use of such a high rotation speed also comparatively viscous coating materials may efficiently be sprayed out through the apertures of the nozzle in this way. By a slow movement of the nozzle with attached frame part rearwardly through pulling the means 6 and 9 while simultaneously spraying coating material substantially radially out of the nozzle a tube may very efficiently be internally coated by a suitable coating material, so that an even and strong coating layer 21 having desired resistance properties may be achieved along the way the nozzle has been moved inside the tube 22.

Furthermore, the device has a means 23 for centering the nozzle in a tube in which it is moved, and this means 23 consists of a circular disc of a flexible material, preferably rubber, arranged at the frame part 9, said disc having substantially the same diameter as the inside diameter of the tube and being arranged to bear against the inner wall 24 of the tube for centering the nozzle. By the fact that the assembly frame part-nozzle is comparatively light this very simple but nevertheless advantageous centering means may be used. The disc 23 will comfortably be adapted to possible irregularities of the tube by being bent in the corresponding way.

Figure 3:
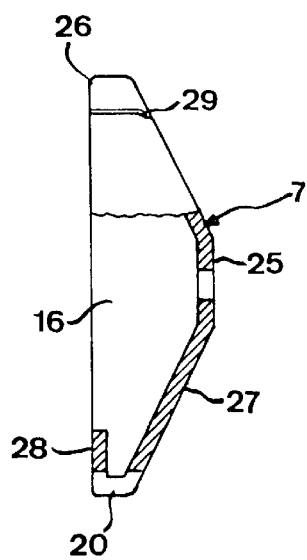
FIG. 3 is a partially sectioned view of a preferred embodiment of the nozzle of the device according to FIGS. 1 and 2.
Figure 4:
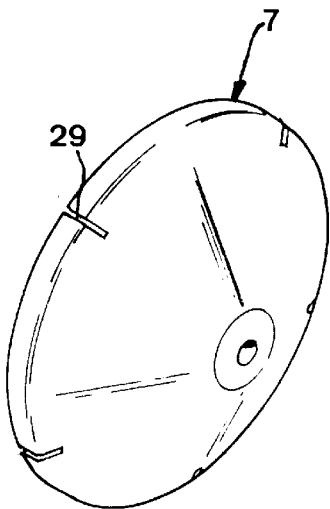
FIG. 4 is a perspective view of the nozzle according to FIG. 3.

A much preferred embodiment of the nozzle 7 will now be described with reference to FIGS. 3 and 4. The nozzle has a wall 27 diverging from a first free end 25 which when the nozzle is moved thorough a tube will come at the end, towards an opposite, second end 26, so that the nozzle has substantially the shape of a truncated cone. Coating material introduced into the space 16 will in this way move outwardly towards the periphery of the nozzle and at the same time in the direction of the second end 26. The nozzle is at the second end 26 provided with a circumferential bottom flange 28 arranged to prevent coating material from leaving the space 16 rearwardly. Thus, the apertures 20 have in axial direction a short extension, and the material will be thrown out therethrough with a high pressure. The apertures have been formed by carrying out radial cuts 29 in the wall 27 of the nozzle substantially in parallel with the axis of rotation of the nozzle to such a depth that the wall has been cut through in the region of the bottom flange. These cuts 29 extending axially will imply a guiding and a spreading of the coating material coming from the apertures 20 in axial direction, and radial spreading is obtained through the very rotation of the nozzle, so that a uniform and fine coating of the inner wall of a tube will be obtained.

Figure 5:
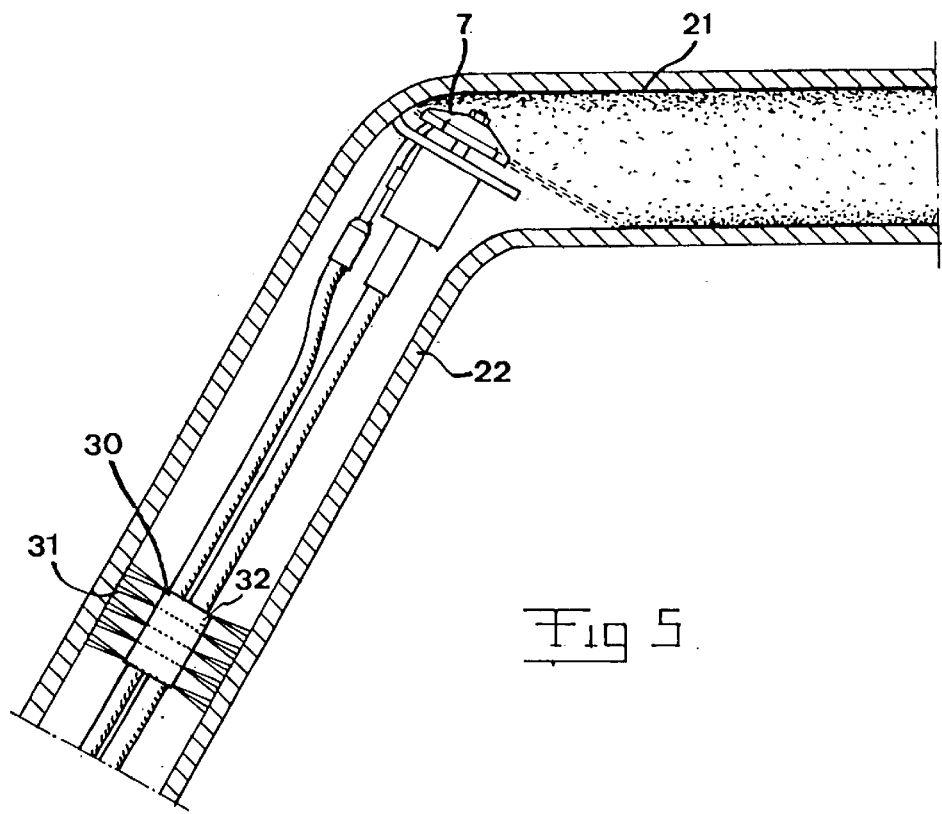
FIG. 5 is a partially sectioned view illustrating how a tube is internally coated through a device according to a second preferred embodiment of the invention.

The advantage of the design of the nozzle according to the invention with a wall diverging from the first end 25 is illustrated in FIG. 5, which has the advantage that the nozzle may be given a comparatively large space 16, but there is nevertheless no risk that it will hit the very tube wall when moved through tube bends, so that the frame part with the nozzle will jump and there will be a risk for leaving any surface of the inner wall of the tube uncoated or a non-uniform coating layer will be produced. This could namely have happened should the nozzle at the first end thereof, i.e. the end coming at the end in the movement thereof, have had the same dimensions in radial direction as at the second end 26. This phenomenon has been exaggerated so as to illustrate this advantage, and the disc 23 will in the practice not leave the contact with the tube wall in bends, so it is given a somewhat larger but substantially the same diameter as the tube.

Figure 6:
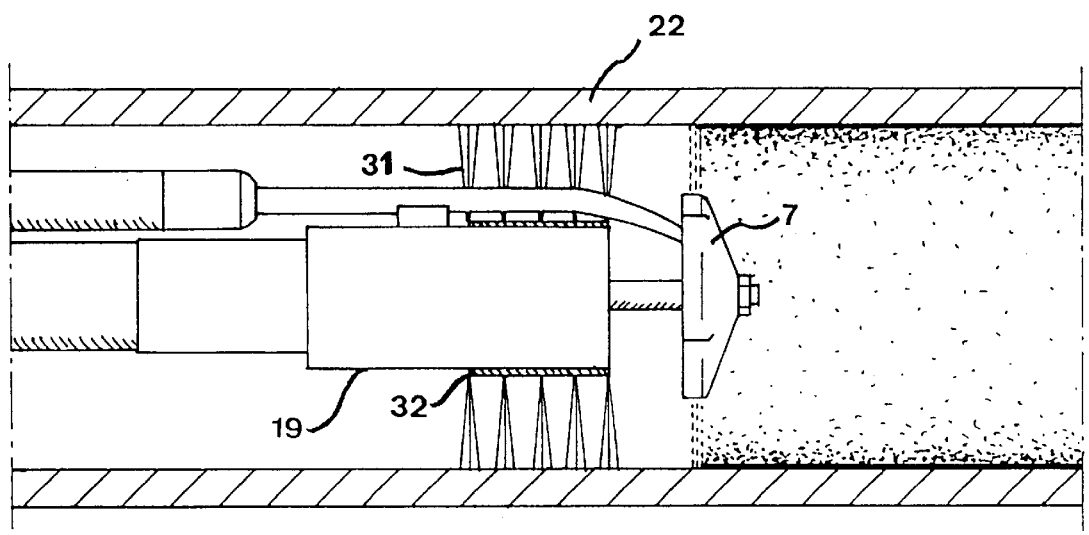
FIG. 6 is a view corresponding to FIG. 2 of a device provided with another type of centering means.

In the embodiment shown in FIG. 5 the device is provided with an additional centering member 30 in the form of a wisp-like member having straws 31 extending substantially radially outwardly in the transversal direction with respect to the axis of rotation of the nozzle in an unloaded state thereof, said straws being intended to be partially bent by the inner wall of the tube for centering of said nozzle when the wisp-like member is introduced into a tube. Accordingly, the centering member 30 has at least in certain directions a somewhat larger cross-section dimension than the tube, which will bend the straws somewhat when moved through the tube and a reliable centering thereby takes place. The member 30 has a sleeve 32, which may be put around the means 6 and 9, as shown in FIG. 5, or around the frame part 19, as shown in FIG. 6. The wisp-like centering member 30 is in the position shown in FIG. 6 intended to function as an actual member for centering the nozzle 7 in the tube and replace the flexible plate 23, while it will in the embodiment according to FIG. 5 function as a stabilizing means, which through the distance thereof to the nozzle and the second centering means 23 will act stabilizing upon the assembly frame part-nozzle and prevent different jumps thereof as a consequence of other possibly generated jerks in the pulling means 6, 9 from occurring.

The centering member 30, such as applied in the embodiment according to FIG. 6, applies a very good centering also in the case when it has to move passed joints being comparatively broad in the longitudinal direction of the tube.

The invention is of course not in any way restricted to the preferred embodiments described above, but many possibilities to modifications thereof will be apparent to a man skilled in the art to which the invention pertains, without departing from the basic idea of the invention.

It is once again underlined that the device according to the invention is suited for internally coating all types of tubes or pipes, also pipes for transporting drinking water, such as coarse feeding pipes therefor, and there is then a problem to firstly remove lime depositions in such pipes. Additionally, the coating material has in such a case to have such characteristics that there is not the slightest risk that it will after a period of time have any negative influence upon the quality of the water transported therein.

The patent claim definition "elongated flexible member, the end of which is rigidly connected to the nozzle" is intended to also comprise the case in which the member is through a non-flexible intermediate piece connected to the nozzle, such as is the case in the embodiment illustrated in the drawings, and it is also possible that the member has some portions that are not flexible. "Flexible" means that the member may be bent in any way, although it may well be comparatively stiff.

"Tubes" may also have another cross-section than a circular one, such as square, and "diameter" relates in such a case to the length of a cross-section dimension.

I claim:

1. A device for applying an internal coating in tubes (22) comprising means (1,6,15) for feeding the coating material (14) to a nozzle (7) and an arrangement structured to influence the material out of the nozzle (7) towards the inner wall (24) of a tube (22) when the nozzle (7) is moved through the tube (22), said arrangement being structured to make the nozzle (7) rotate about an axis being substantially parallel to the center axis of a tube (22) through which the nozzle (7) is moved while throwing the material outwardly through apertures (20) arranged substantially radially in the nozzle (7) towards the inner wall of the tube (22), characterized in that the nozzle (7) has an inner space (16) for receiving coating material (14) fed thereto through said means (1, 6, 15), said space (16) being delimited by a wall (27) tapering the outer cross-section of the nozzle (7) towards a free end (25) of the nozzle (7) which is located remotely with respect to the feeding means (1, 6, 15) and which will come last when the nozzle (7) is moved through a tube (22), radial cuts (29) are carried out in the wall (27) of the nozzle (7) substantially in parallel with the axis of rotation of the nozzle (7) for forming said radial apertures (20), and each of said cuts (29) is structured and arranged to cause spreading of the coating material (14) thrown through the respective aperture (20) in an axial direction.

2. A device according to claim 1, wherein said means (1, 6, 15) for feeding the coating material (14) comprises driving means (10) structured and arranged to be located outside the tube (22) to be coated and to drive an elongated flexible member (17) to rotate, the end of which member (17) being rigidly connected to the nozzle (7) for rotating thereof.

3. A device according to claim 2, characterized in that the driving means (10) is adapted to make said elongated flexible member (17) and thereby the nozzle (7) rotate with a rotation speed exceeding 4000 revolutions/minute.

4. A device according to claim 3, characterized in that the driving means (10) is adapted to make said elongated flexible member (17) and thereby the nozzle (7) rotate with a rotation speed preferably between 6000 and 8000 revolutions/minute.

5. A device according to claim 3, characterized in that said elongated flexible member (17) is a metal wire.

6. A device according to claim 3, characterized in that it comprises means (6,8,9,12) for making it possible to pull the nozzle (7) through a tube (22) with the nozzle (7) being a part of the device coming at the end in a movement through the tube (22).

7. A device according to claim 2, characterized in that said elongated flexible member (17) is a metal wire.

8. A device according to claim 2, characterized in that it comprises means (6, 8, 9, 12) for making it possible to pull the nozzle (17) through a tube with the nozzle being a part of the device coming at the end in the movement through the tube.

9. A device according to claim 2, characterized in that it is structured for coating of inner walls (24) of water pipes (22) for reconditioning thereof.

10. A device according to claim 9, characterized in that it is structured for internal coating of pipes (22) in heating, water and sanitation-systems of buildings.

11. A device according to claim 2, characterized in that the feeding means (1, 6, 15) is structured to feed a coating material (14) comprising a mixture of polyester and an hardening agent.

12. A device according to claim 1, characterized in that said mixture also comprises glass flakes for obtaining a coating consisting of a glass flake reinforced polyester.

13. A device according to claim 1, characterized in that the nozzle (7) has an at least partially conical outer shape.

14. A device according to claim 1, characterized in that an inner wall of the nozzle delimiting said space (16) diverges in the direction from said end (25).

15. A device according to claim 14, characterized in that the apertures (20) arranged substantially radially are arranged in the wall at a second end (26) of the nozzle located opposite to said free end (25) and where said space (16) is broadest.

16. A device according to claim 15, characterized in that the space (16) of the nozzle is at said second end (26) at least circumferentially delimited by a bottom flange (28) extending inwardly from the inner wall for guiding coating material introduced into the space out through said radial apertures (20).

17. A device according to claim 10, characterized in that said radial cuts (29) extend in the wall (27) of the nozzle (7) to such a depth that the wall (27) has been cut through in the region of the bottom flange (28).

18. A device according to claim 1, characterized in that it also comprises means (23) for centering the nozzle (7) in a tube (22), the inner wall (24) of which is to be coated, with the axis of rotation thereof substantially coinciding with the center axis of the tube (22), and that said means (23) comprises a disc (23) of flexible material arranged in the direction of movement of the nozzle in front thereof and which has substantially the same diameter as the inside diameter of the tube (22), said disc (23) being structured to bear against the inner wall of the tube (22) for centering the nozzle 7.

19. A device according to claims 1, characterized in that it also comprises means (30) for centering the nozzle (7) in a tube (22), the inner wall (24) of which is to be coated, with the axis of rotation thereof substantially coinciding with the center axis of the tube (22), and that said means comprises a wisp-shaped member (30) arranged in the direction of movement of the nozzle (7) in front of the nozzle (7) and which in an unloaded state has straws (31) extending radially outwardly and transversely with respect to the axis of rotation of the nozzle (7), said straws (31) being structured to be partially bent by the inner wall (24) of the tube (22) when the wisp-shaped member (30) is introduced into a tube (22) for centering said nozzle (7).

20. A device according to claim 1, characterized in that said cuts (29) extend both in the radial and axial directions.

* * * * *